(12) United States Patent
Wang et al.

(10) Patent No.: US 12,175,051 B2
(45) Date of Patent: Dec. 24, 2024

(54) METHOD AND APPARATUS FOR FINGER INPUT SENSING

(71) Applicants: NATIONAL RESEARCH COUNCIL OF CANADA, Ottawa (CA); Daniel Vogel, Waterloo (CA); Omid Salehi-Abari, Waterloo (CA); Ju Wang, Montreal (CA)

(72) Inventors: Ju Wang, Montreal (CA); Omid Salehi-Abari, Waterloo (CA); Daniel Vogel, Waterloo (CA); Keiko Katsuragawa, Waterloo (CA)

(73) Assignee: NATIONAL RESEARCH COUNCIL OF CANADA, Ottawa (CA)

( * ) Notice: Subject to any disclaimer, the term of this patent is extended or adjusted under 35 U.S.C. 154(b) by 0 days.

(21) Appl. No.: 18/251,911

(22) PCT Filed: Nov. 5, 2021

(86) PCT No.: PCT/IB2021/060280
§ 371 (c)(1),
(2) Date: May 5, 2023

(87) PCT Pub. No.: WO2022/097093
PCT Pub. Date: May 12, 2022

(65) Prior Publication Data
US 2024/0012527 A1 Jan. 11, 2024

(30) Foreign Application Priority Data
Nov. 6, 2020 (CA) ................. CA 3098749

(51) Int. Cl.
*G06F 3/046* (2006.01)
*G06F 3/0488* (2022.01)
(Continued)

(52) U.S. Cl.
CPC ............ *G06F 3/046* (2013.01); *G06F 3/0488* (2013.01); *G06K 19/0723* (2013.01); *H04B 17/318* (2015.01)

(58) Field of Classification Search
CPC .......... G06K 19/0723; G06K 19/0716; G06K 19/07701; G06F 3/0488; G06F 3/046; G06F 3/017; H04B 17/318
See application file for complete search history.

(56) References Cited

U.S. PATENT DOCUMENTS

2018/0157876 A1* 6/2018 Chai ................. G06K 19/0718

OTHER PUBLICATIONS

Li, Hanchuan et al. "IDSense: A human object interaction detection system based on passive UHF RFID." Proceedings of the 33rd Annual ACM Conference on Human Factors in Computing Systems. 2015.

(Continued)

*Primary Examiner* — Deeprose Subedi
(74) *Attorney, Agent, or Firm* — Perry + Currier Inc.

(57) ABSTRACT

A method and apparatus are provided for effecting an RFID-based finger input sensing system using a transmission line connected to at least two RFID tags, by analyzing a plurality of features relating to the number of spikes in the derivatives of the RSS, timing of maximum RSS and the spikes of the RSS derivatives, relative RSS magnitude between the at least two RFID tags, and increase/decrease trend of the RSS, thereby eliminating the need for calibration and training.

15 Claims, 8 Drawing Sheets

(51) Int. Cl.
 G06K 19/07 (2006.01)
 H04B 17/318 (2015.01)

(56) References Cited

OTHER PUBLICATIONS

Pradhan, Swadhin, et al. "Rio: A pervasive rfid-based touch gesture interface." Proceedings of the 23rd Annual International Conference on Mobile Computing and Networking. 2017.
Bainbridge, Rachel et al. "Wireless hand gesture capture through wearable passive tag sensing." 2011 International Conference on Body Sensor Networks. IEEE, 2011.
Balanis, Constantine A., ed. Modern antenna handbook. John Wiley & Sons, 2011.
Caloz, Christophe et al., "Electromagnetic metamaterials: transmission line theory and microwave applications". John Wiley & Sons, 2005.
Gao, Chuhan et al., "{LiveTag}: Sensing {Human-Object} Interaction through Passive Chipless {WiFi} Tags." 15th USENIX Symposium on Networked Systems Design and Implementation (NSDI 18). 2018.
Jonassen, Niels. "Human body capacitance: static or dynamic concept?[ESD]." Electrical Overstress/Electrostatic Discharge Symposium Proceedings. 1998 (Cat. No. 98TH8347). IEEE, 1998.
Katsuragawa, Keiko, et al. "Tip-tap: battery-free discrete 2D fingertip input." Proceedings of the 32nd Annual ACM Symposium on User Interface Software and Technology. 2019.
Kim, David, et al. "Digits: freehand 3D interactions anywhere using a wrist-worn gloveless sensor." Proceedings of the 25th annual ACM symposium on User interface software and technology. 2012.
Li, Hanchuan, et al. "Paperid: A technique for drawing functional battery-free wireless interfaces on paper." Proceedings of the 2016 CHI Conference on Human Factors in Computing Systems. 2016.
Wang, Ju, et al. "Soil moisture sensing with commodity RFID systems." Proceedings of the 18th International Conference on Mobile Systems, Applications, and Services. 2020.
Wang, Ju, et al. "Are RFID sensing systems ready for the real world ?. " Proceedings of the 17th Annual International Conference on Mobile Systems, Applications, and Services. 2019.
Wang, Ju, et al. "D-watch: Embracing" bad" multipaths for device-free localization with Cots Rfid devices." Proceedings of the 12th International on Conference on emerging Networking Experiments and Technologies. 2016.
Wang, Jue et al. "RF-IDraw: Virtual touch screen in the air using RF signals." Acm Sigcomm Computer Communication Review 44.4 (2014): 235-246.
Wang, Ju, et al. "Sensing finger input using an rfid transmission line." Proceedings of the 18th Conference on Embedded Networked Sensor Systems. 2020.
Alien Technology Corp, "Squiggle Inlay (Higgs 4)", ALN-9740, 2017, atlasrfidstore.com.
Feig Electronics, "Benchmark Testing of UHF RFID Readers: How to Get Maximum Performance with the Latest Rain Rfid Tags",, 2017, rfidreadernews.com.
Erman, Fuad, et al. "Low-profile folded dipole UHF RFID tag antenna with outer strip lines formetal mounting application." Turkish Journal of Electrical Engineering and Computer Sciences 28.5 (2020): 2643-2656.
Wang, Ge, et al. "Towards replay-resilient RFID authentication." Proceedings of the 24th Annual International Conference on Mobile Computing and Networking. 2018.
Geeks for Geeks, "Confusion Matrix in Machine Learning", May 1, 2024, geeksforgeeks.org.
Ma, Yunfei, et al. "Enabling deep-tissue networking for miniature medical devices." Proceedings of the 2018 Conference of the ACM Special Interest Group on Data Communication. 2018.
Wikipedia, "Reflection Coefficient", wikipedia.org, Mar. 15, 2023, Retrieved from URL: https://en.wikipedia.org/w/index.php?title=Reflection_coefficient&oldid=1144764680.
EPC Global, Low Level Reader Protocol (LLRP), Version 1.0, Ratified Standard, Apr. 12, 2007, EPCglobal Inc.,.
Lien, Jaime, et al. "Soli: Ubiquitous gesture sensing with millimeter wave radar." ACM Transactions on Graphics (TOG) 35.4 (2016): 1-19.
Wallace, Jon W. et al., "Mutual coupling in MIMO wireless systems: A rigorous network theory analysis." IEEE transactions on wireless communications 3.4 (2004): 1317-1325.
Ultra Leap, "Leap Motion", Jan. 17, 2020, https://www.leapmotion.com/, Retrieved from the Wayback Machine on May 23, 2024 from URL: https://web.archive.org/web/20200115031228/https://www.ultraleap.com/.
Atlas RFID Store, "RFMAX RFID race timing antenna kit- 15 ft cable". atlasRFIDstore. , 2018,https://www.atlasrfidstore.com/rfmax-rfid-race-timing-antenna-kit-15-ft-cable/ Retrieved from the Wayback Machine on Jun. 20, 2024 from URL: https://web.archive.org/web/20161118061802/https://www.atlasrfidstore.com/rfmax-rfid-race-timing-antenna-kit-15-ft-cable/.
Murata Electronics, "RFID LXMS31 Acna", murata.com, 2020.
Wang, Jue et al. "Dude, where's my card? RFID positioning that works with multipath and non-line of sight." Proceedings of the Acm SIGCOMM 2013 conference on SIGCOMM. 2013.
Wang, Ju et al., "Sensing finger input using an RFID transmission line", [in ACM Sensys20]. YouTube.com 2020, Retrieved from the Internet on Jun. 20, 2024 from URL: https://www.youtube.com/watch?v=L_5GfVamZMs.
Wang, Jingxian, et al. "Pushing the range limits of commercial passive {RFIDs}." 16th USENIX Symposium on Networked Systems Design and Implementation (NSDI 19). 2019.
Lenehan, Mike, "IMPINJ Support", support.impinj.com, Jan. 14, 2021, REtrieved from the Internet on Jul. 16, 2024 from URL: https://support.impinj.com/hc/en-US/articles/202755318-Application-Note-Low-Level-User-Data-Support.
Impinj, "Impinj R420 Readers", impinj.com, 2010, Retrieved from the Internet on Jul. 16, 2024 from URL: https://www.impinj.com/products/readers.
Amazon, "Yanzeo SR681 UHF RFID Reader", amazon.com, date unknown, Retrieved from the Internet on Jul. 16, 2024 from URL: https://www.amazon.com/Yanzeo-SR681-Outdoor-Antenna-Integrated/dp/B072N4P2MG.

\* cited by examiner

METHOD AND APPARATUS FOR FINGER INPUT SENSING

CROSS-REFERENCE TO RELATED APPLICATION(S)

This application is related to and claims priority to Canadian Patent Application entitled Sensing Finger Input Using an RFID Transmission Line having serial number 3098749, filed Nov. 6, 2020 and incorporated by reference herein.

BACKGROUND OF THE INVENTION

1. Field of the Invention

The present invention is directed to sensor networks and more particularly to a method and apparatus for finger input sensing.

2. Description of the Related Art

The following prior art is relevant to this disclosure:

[1] atlasRFIDstore. 2018. RFMAX RFID Antenna. https://www.atlasrfidstore.com/rfmax-rfid-race-timing-antenna-kit-15-ft-cable/. Last accessed: Jul. 27, 2019.

[2] Rachel Bainbridge and Joseph A Paradiso. 2011. Wireless hand gesture capture through wearable passive tag sensing. In Proc. IEEE International Conference on Body Sensor Networks. 200-204.

[3] Constantine A Balanis. 2011. Modern antenna handbook. John Wiley & Sons.

[4] Christophe Caloz and Tatsuo Itoh. 2005. Electromagnetic metamaterials: transmission line theory and microwave applications. John Wiley & Sons.

[5] Alien Technology Corp. 2017. UHF ALN-9740 tag. https:/www.atlasrfidstore.com/alien-squiggle-rfid-white-wet-inlay-aln-9470- higgs-4/. Last accessed: Jul. 17, 2018.

[6] Murata Electronics. 2020. RFID LXMS31ACNA. https://www.digikey.ca/productdetail/en/LXMS31ACNA-011/490-11802-1-ND/5333642/?itemSeq=313684124. Last accessed: Jan. 17, 2020.

[7] Chuhan Gao, Yilong Li, and Xinyu Zhang. 2018. LiveTag: Sensing Human-Object Interaction through Passive Chipless WiFi Tags. In Proc. USENIX NSDI. 60-63.

[8] geeksforgeeks. 2018. Confusion Matrix in Machine Learning. https://www.geeksforgeeks.org/confusion-matrix-machine-learning/. Last accessed: Jan. 27, 2020.

[9] Impinj. 2005. Low Level User Data Support. https://support.impinj.com/hc/enus/articles/202755318-Application-Note-Low-Level-User-Data-Support. Last accessed: Feb. 24, 2020.

[10] Impinj. 2010. Impinj R420 Readers. http://www.Impinj.com/products/readers/. Last accessed: Jun. 27, 2018.

[11] EPCglobal Inc. 2007. Low Level Reader Protocol, Version 1.0. 1. (2007).

[12] FEIG ELECTRONICS Inc. 2017. LRU1002 Fixed UHF Long-Range Reader. https://rfidreadernews.com/wp-content/uploads/2017/04/FEIG-Whitepaper-Benchmark-Testing-of-UHF-RFID-Readers.pdf. Last accessed: Jul. 17, 2019.

[13] Niels Jonassen. 1998. Human body capacitance: static or dynamic concept. In Proc. of Electrical Overstress Electrostatic Discharge Symposium. 111-117.

[14] Keiko Katsuragawa, Ju Wang, Ziyang Shan, Ningshan Ouyang, Omid Abari, and Daniel Vogel. 2019. Tip-Tap: Battery-free Discrete 2D Fingertip Input. In Proc. ACM UIST. 1045-1057.

[15] David Kim, Otmar Hilliges, Shahram Izadi, Alex D Butler, Jiawen Chen, Iason Oikonomidis, and Patrick Olivier. 2012. Digits: freehand 3D interactions anywhere using a wrist-worn gloveless sensor. In Proc. ACM UIST. 167-176.

[16] Hanchuan Li, Eric Brockmeyer, Elizabeth J Carter, Josh Fromm, Scott E Hudson, Shwetak N Patel, and Alanson Sample. 2016. PaperID: A technique for drawing functional battery-free wireless interfaces on paper. In Proc. ACM CHI. 5885-5896.

[17] Hanchuan Li, Can Ye, and Alanson P Sample. 2015. IDSense: A human object interaction detection system based on passive UHF RFID. In Proc. ACM CHI. 2555-2564.

[18] Jaime Lien, Nicholas Gillian, M Emre Karagozler, Patrick Amihood, Carsten Schwesig, Erik Olson, Hakim Raja, and Ivan Poupyrev. 2016. Soli: Ubiquitous gesture sensing with millimeter wave radar. ACM Transactions on Graphics (TOG) 35, 4 (2016), 142.

[19] Yunfei Ma, Zhihong Luo, Christoph Steiger, Giovanni Traverso, and Fadel Adib. 2018. Enabling deep-tissue networking for miniature medical devices. In Proc. ACM SIGCOMM. 417-431.

[20] Swadhin Pradhan, Eugene Chai, Karthikeyan Sundaresan, Lili Qiu, Mohammad A Khojastepour, and Sampath Rangarajan. 2017. RIO: A Pervasive RFID-based Touch Gesture Interface. In Proc. ACM MobiCom. 261-274.

[21] Ultraleap. 2020. Leap Motion. https://www.leapmotion.com. Last accessed: Jan. 17, 2020.

[22] Jon W Wallace and Michael A Jensen. 2004. Mutual coupling in MIMO wireless systems: A rigorous network theory analysis. IEEE transactions on wireless communications 3,4 (2004), 1317-1325.

[23] Ge Wang, Haofan Cai, Chen Qian, Jinsong Han, Xin Li, Han Ding, and Jizhong Zhao. 2018. Towards replay-resilient RFID authentication. In Proc. ACM Mobicom. 385-399.

[24] Ju Wang, Liqiong Chang, Omid Abari, and Srinivasan Keshav. 2019. Are RFID Sensing Systems Ready for the Real World?. In Proc. ACM Mobisys. 366-377.

[25] Ju Wang, Liqiong Chang, Shourya Aggarwal, Omid Abari, and Srinivasan Keshav. 2020. Soil moisture sensing with commodity RFID systems. In ACM Proceedings of the 18th International Conference on Mobile Systems, Applications, and Services (MobiSys). 273-285.

[26] Jue Wang and Dina Katabi. 2013. Dude, where's my card?: RFID positioning that works with multipath and non-line of sight. In ACM SIGCOMM. 51-62.

[27] Ju Wang, Jianyan Li, Mohammad Hossein Mazaheri, Keiko Katsuragawa, Daniel Vogel, and Omid Abari. 2020. Code and Data of Sensing Finger Input Using RFID. https://github.com/RFIDInput/Sensing-Finger-Input-Using-An-RFIDTransmission-Line. Last accessed: Jun. 27, 2020.

[28] Ju Wang, Jianyan Li, Mohammad Hossein Mazaheri, Keiko Katsuragawa, Daniel Vogel, and Omid Abari. 2020. Demo Video of Sensing Finger Input Using RFID. https://youtu.be/L_5GfVamZMs. Last accessed: Jun. 27, 2020.

[29] Ju Wang, Deepak Vasisht, and Dina Katabi. 2014. RF-IDraw: virtual touch screen in the air using RF signals. In Proc. ACM Sigcomm. 235-246.

[30] Ju Wang, Jie Xiong, Hongbo Jiang, Xiaojiang Chen, and Dingyi Fang. 2017. D-Watch: Embracing "Bad" multipaths for device-free localization with COTS RFID devices. IEEE/ACM Transactions on Networking (TON) 25, 6 (2017), 3559-3572.

[31] Jingxian Wang, Junbo Zhang, Rajarshi Saha, Haojian Jin, and Swarun Kumar. 2019. Pushing the range limits of commercial passive rfids. In Proc. of USENIX NSDI. 301-316.

[32] Wikipedia. 2019. Reflection coefficient. https://en.wikipedia.org/wiki/Reflection_coefficient. Last accessed: Jan. 27, 2020.

[33] Yanzeo. 2020. Yanzeo SR681 UHF RFID Reader. https://www.amazon.com/Yanzeo-SR681-Outdoor-Antenna-Integrated/dp-Integrated/dp-Integrated/dp/B072N4P2MG/ref=sr_1_3?crid=27JIJI2C7X9B4&dchild=1&keywords=uhf+reader&qid=1593475974&sprefix=uhf+rea%2Caps%2C148&sr=8-3. Last accessed: Jun. 27, 2020.

Smartphones and voice assistants may be as control inputs to smart devices such as smart televisions, thermostats, and light bulbs, etc. Smartphone software applications can be hard to configure, they are not easily shared among others, and they can take time to open and navigate. Speaking to a voice assistant can be socially uncomfortable, and relatively simple operations, such as setting the brightness of a specific light, require verbose voice inputs. For these and other reasons, general purpose user input methods have been proposed to sense finger input gestures, primarily based on computer vision [see [15] and [21]], mmWave [see [18]], Wi-Fi [see {17}], and RFID [see [16] technologies. Of these approaches, systems based on RFID are particularly attractive since RFID is wireless, battery-free, lightweight, and very low cost [see [14], [17]and [20]]. Consequently, RFID tags can be embedded into common objects, such as cups and doorknobs, to enable sensing and interaction.

However, a general purpose RFID-based finger input sensing device faces technical challenges. The device should detect multiple gesture inputs to be useful as a remote control for smart devices, and it should be robust to changes in device position and the surrounding RF environment (e.g. people moving nearby) since many smart device applications are used in mobile settings. Meeting both of these challenges without adding additional RFID tags, or requiring frequent calibration and training, is a problem.

For example, [16] discusses using an RFID tag as a binary sensor to detect finger touches, but requires many tags to detect multiple finger inputs. The RIO system disclosed in [20] can detect multiple inputs on a single tag using the phase of the RFID signal, but is not robust to changes in tag location or RF environment without frequent device re-calibration and retraining. These systems rely on touching different positions along an RFID tag antenna to change the impedance matching between the RFID chip and its antenna, which in turn changes the received signal strength (RSS) or phase of the tag response signal [see 16, 17, 20]. However, a problem exists in that changes in tag location or RF environment also significantly alter the RSS and phase, resulting in prior art systems requiring frequent re-calibration and re-training.

IDSense [17] focuses on detecting a small set of discrete actions for input related to objects. The method attaches RFID tags to objects and uses multiple signal features (i.e., phase, RSS and reading rate) to detect four tag: tag is moving, tag is covered by a hand, tag has been swiped by a finger, or none of the above. However, detection only works if the objects do not move after initial calibration, which limits its applications.

Other prior art approaches have expanded the application of touch inputs beyond the single swipe gesture demonstrated by IDSense. For example, RIO [20] detects a finger touch and a swipe on RFID tags by tracking changes in phase values. Due to fine-grained phase information, RIO can locate finger touch positions in a controlled environment and a fixed tag location. However, phase values can vary as large as $\pi$ rad with minor changes in the tag location (e.g. 10 cm) [24]. Without re-calibration after the tag is moved, the input detection becomes unreliable, making it unsuitable for many real-world deployments.

Other techniques enable user input by tracking coarse movements of one or more tags attached to a hand or a finger. For example, Bainbridge et al. [2] use WISP RFID tags and 3-axis accelerometers attached to fingers for gesture recognition. However, the method also requires a powered RFID reader and antenna to be mounted on the arm and hand, limiting real-world applications. RF-IDraw [29] tracks the path of an RFID tag attached to a user's finger with, and D-Watch [30] tracks a fist location using RFID tags placed in the surrounding environment. Given the very coarse level of tracking, neither method is well suited for more fine-grained finger input.

PaperID [16] uses an approach wherein a half-antenna design is used with an RFID chip to act like a binary sensor capable of detecting a finger touch. Specifically, when the RFID tag is touched, the finger acts as another half-antenna, allowing the tag to harvest enough power for operation so that the RFID reader can read the touched tag. To increase input diversity, however, multiple tags must be used in a large array and adjacent tags must be more than a half-wavelength apart to avoid a coupling effect [22, 23]. With a 915 MHz RFID signal, this translates to spacing at least 16.4 cm, which results in very large devices required to support even a few different inputs. Also, for many handheld interactions the size of input devices should be small. Tip-Tap [14] uses connection and disconnection among multiple RFID chips for finger inputs, but the system requires six RFID chips to enable nine finger inputs.

SUMMARY OF THE INVENTION

According to aspects discussed below, two RFID chips are attached to a substrate and connected with two thin strips of copper to form a transmission line. This enables exploitation of the trend of RSS and relative RSS values in each of the connected RFID chips. When a finger slides between different positions along the transmission line, the finger movement continuously changes the impedance matching between each RFID chip and its antenna. Thus, the momentary trend of RSS increases or decreases continuously, no matter where the tag is located and irrespective of changes in the RF environment.

According to an embodiment, a method is provided for detecting short finger sliding gestures that connect (or cross) key positions along the transmission line based on relative changes and trends in RSS. As a result, the detection method set forth herein is independent of tag location and RF environment, such that the device does not require re-calibration or re-training. This enables user input for many smart device applications. For example, the device discussed herein can be used as a remote control or can be integrated into household items such as a pillow, book, or chair, thereby enabling the remote adjustment of smart device properties such as light intensity, room temperature, or TV volume, or in settings such as a lecture hall for an audience response system.

Therefore, according to aspects discussed below, a method and apparatus are provided for effecting an RFID-based finger input sensing system using a transmission line, which eliminates the need for calibration and training. Furthermore, a detection method is provided based on a set of finger input gestures with an associated detection algorithm designed to reliably differentiate gestures.

In contrast with the prior art cited above, the apparatus set forth herein requires only two RFID tags to detect ten finger input gestures. Also, the method set forth herein enables robust input detection even when tag location changes.

The above aspects can be attained by an apparatus for finger input sensing, comprising: at least two RFID tags, each including a microchip and an antenna; a reader for interrogating the at least two RFID tags; and at least two transmission lines connecting the at least two RFID tags via their respective antennas, whereby upon interrogation by the reader each RFID tag returns a characteristic received signal strength (RSS) and pattern of RSS changes for different sliding finger gestures between spaced touch positions along the at least two transmission lines.

According to additional aspects, there is provided a method for finger input sensing, comprising: interrogating at least two RFID tags by a reader; transmitting from each of the at least two RFID tags connected by at least two transmission lines a characteristic received signal strength (RSS) and pattern of RSS changes for different sliding finger gestures between spaced touch positions along the at least two transmission lines; receiving the characteristic received signal strength (RSS) and pattern of RSS changes from each of the at least two RFID tags at the reader; arranging a plurality of spaced touch positions in sections along the transmission lines delineated by boundary positions for defining different finger sliding gestures, wherein each sliding gesture is performed by sliding a finger along a specific section of the transmission lines such that the RSS of each tag increases to a peak at a specific touch position and decreases for positions on opposite sides of the specific position; and detecting each sliding gesture by analyzing a plurality of features relating to the number of spikes in the derivatives of the RSS, timing of maximum RSS and the spikes of the RSS derivatives, relative RSS magnitude between the at least two RFID tags, and increase/decrease trend of the RSS.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
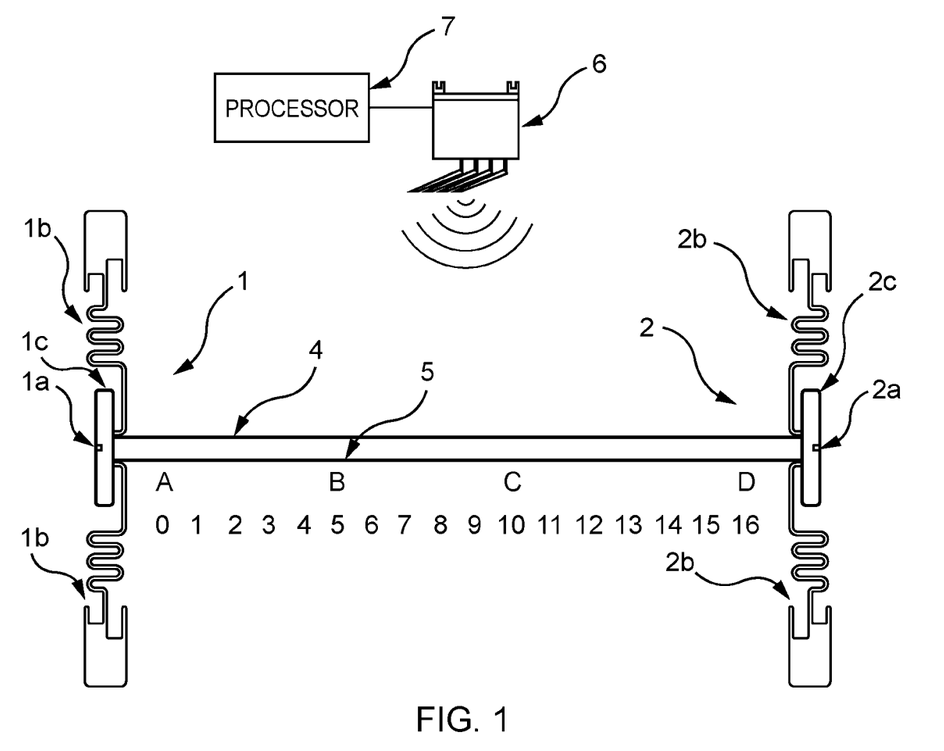
FIG. 1 shows an RFID-based system for detecting finger gestures, according to an exemplary embodiment.

FIG. 1 illustrates an RFID-based system capable of detecting finger gestures in a manner that is robust to changes in device location or environment. Two RFID tags (1 and 2) are spaced apart and mounted on a substrate. Each tag 1 and 2 includes a microchip 1a, 2a, disposed on an inner resonating LC loop 1c, 2c, and a simple dipole antenna 1b, 2b. Although a dipole antenna is shown, it is contemplated that any design of antenna can be used, such a a monopole antenna or patch antenna. The tags 1 and 2 are connected together by pair of transmission lines 4, 5 which, in an embodiment are 1.6 mm wide copper strips. Power for the microchips 1a and 2a may be obtained from the radio energy radiated by one or more interrogator antennae connected to a reader 6. The reader 6 is connected to a processor 7 for implementing a detection method based on a set of finger input gestures with an associated detection algorithm designed to reliably differentiate gestures, as discussed in greater detail below.

The return signal from each dipole antenna 1b, 2b is modulated with a unique ID by microchip 1a, 2a. Reader 6 detects the reflected signal and unique ID of each microchip 1a, 2a and based on the characteristics of the return signal finger, processor 7 distinguishes input gestures. As discussed below, touching different positions along the transmission lines 4, 5 changes the impedance matching between each microchip 1a, 2a and its antenna 1b, 2b, resulting in a characteristic received signal strength (RSS) measured at the reader 6. By analyzing relative RSS differences and the pattern of RSS changes, processor 7 senses different sliding finger gestures.

As shown in FIG. 1, seventeen touch positions (0-16) are arranged along the transmission lines 4, 5. In an embodiment, the length of the transmission lines 4, 5 was 16 cm and each touch position was separated by 1 cm. The RSS values of each tag 1, 2 vary when a finger touches different positions.

Figure 2:
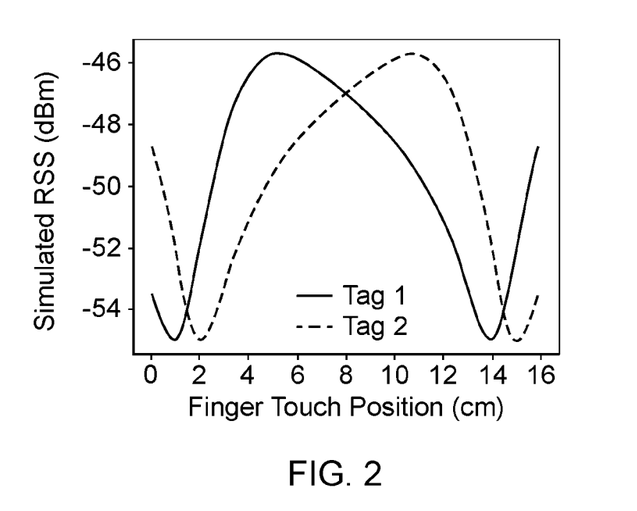
FIG. 2 shows RSS values measured at different touch positions along transmission lines of the RFID-based system of FIG. 1.

FIG. 2 shows the RSS measured at different touch positions along the transmission lines 4, 5, wherein RSS values of each tag increase to a maximum at a specific position (e.g., position 5 for tag 1) and then decrease for positions on either side (e.g. to the left and right) of the position with maximum RSS. When placing a finger on the transmission lines 4, 5, the finger acts as a capacitor and loads the transmission lines. However, touching different positions of the transmission lines creates different impedances to each RFID microchip 1a, 2a. The added impedance is a function of the distance from the finger touch position to the microchip. RSS reaches the maximum value when the added impedance matches the impedance of the antennas.

Experimental results of logged RSS data produced by the device of FIG. 1 for all seventeen positions along the transmission lines 4, 5, at multiple locations relative to reader 5 (i.e. repeated at twenty-two different locations distributed across a 2.5 m×2.5 m area, such that the distance between two adjacent locations is ~0.6 m), establish that the increase or decrease in RSS across finger positions is independent of device location. For example, when a finger moves from the 5 cm position to the 11 cm position, all RSS values of tag 1 decrease, and all RSS values of tag 2 increase, irrespective of the location of tags 1, 2 relative to reader 6. Furthermore, the touch position where the RSS is maximum is also independent of the location of tags 1, 2 relative to reader 6. In particular, the maximum RSS of tag 1 has been shown to always be at the 5 cm touch position, and the maximum RSS of tag 2 has been shown to always be at the 11 cm touch position.

Figure 3A:
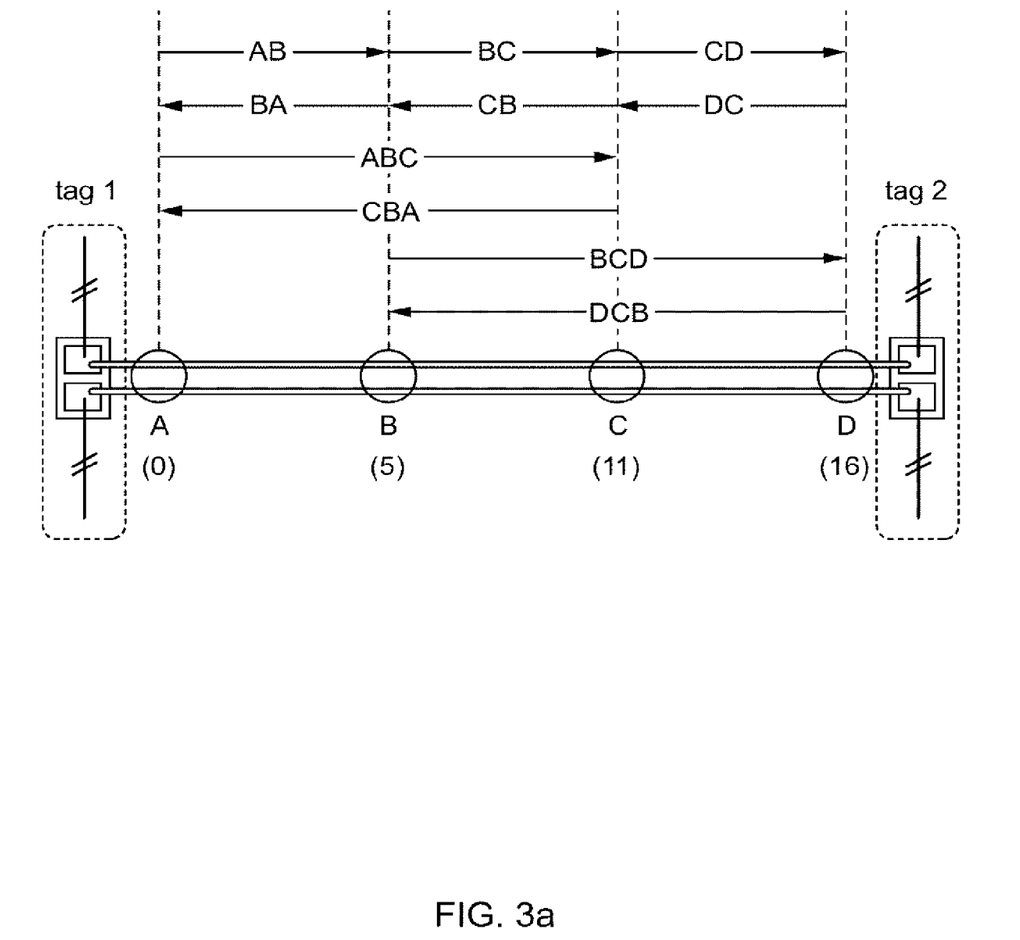
FIG. 3a diagram showing ten finger gestures for using the RFID-based system of FIG. 1.
Figure 3B:
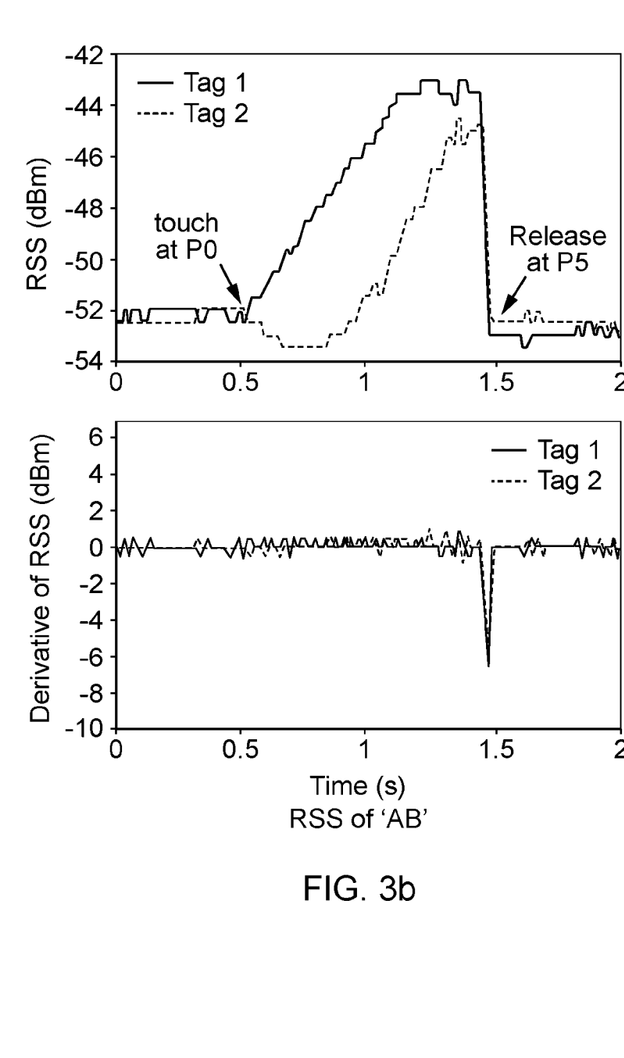
FIGS. 3b-3k show sequences of RSS values and numerical derivatives resulting from ten sliding finger gesture inputs using the RFID-based system of FIG. 1.
Figure 3C:
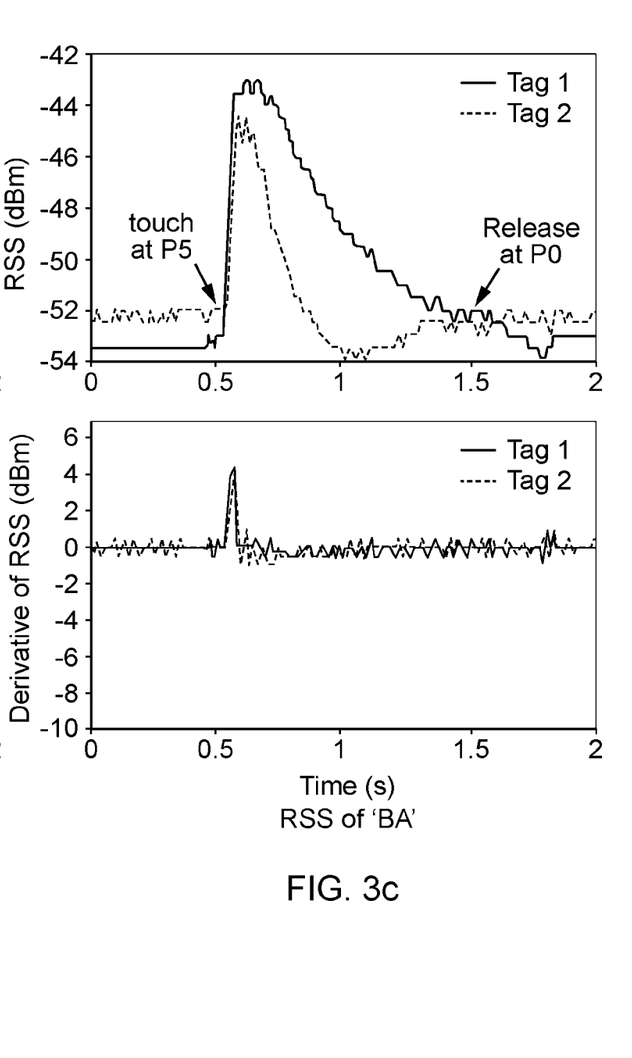
Figure 3D:
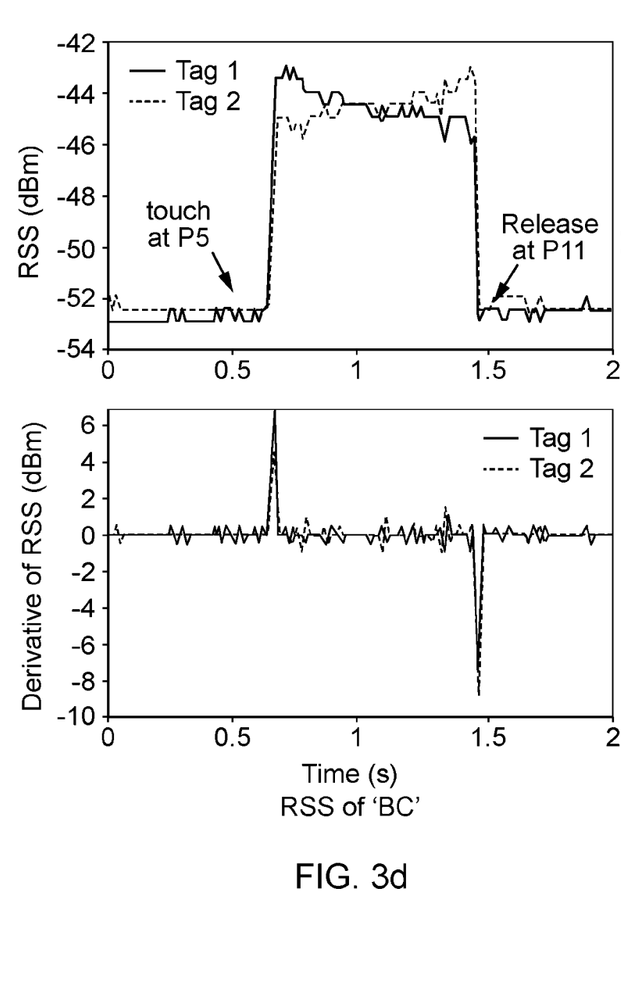
Figure 3E:
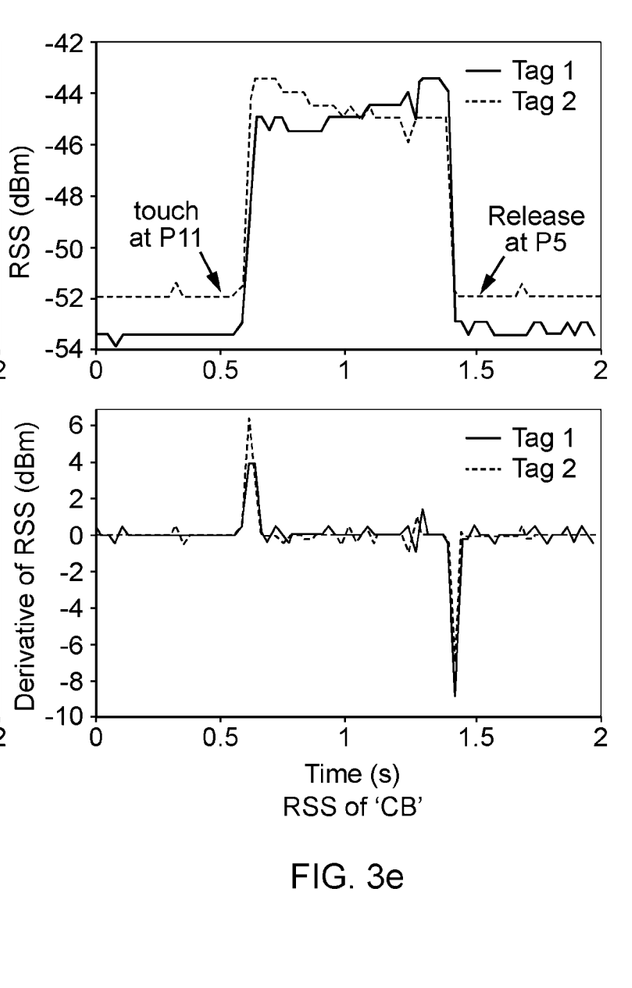
Figure 3F:
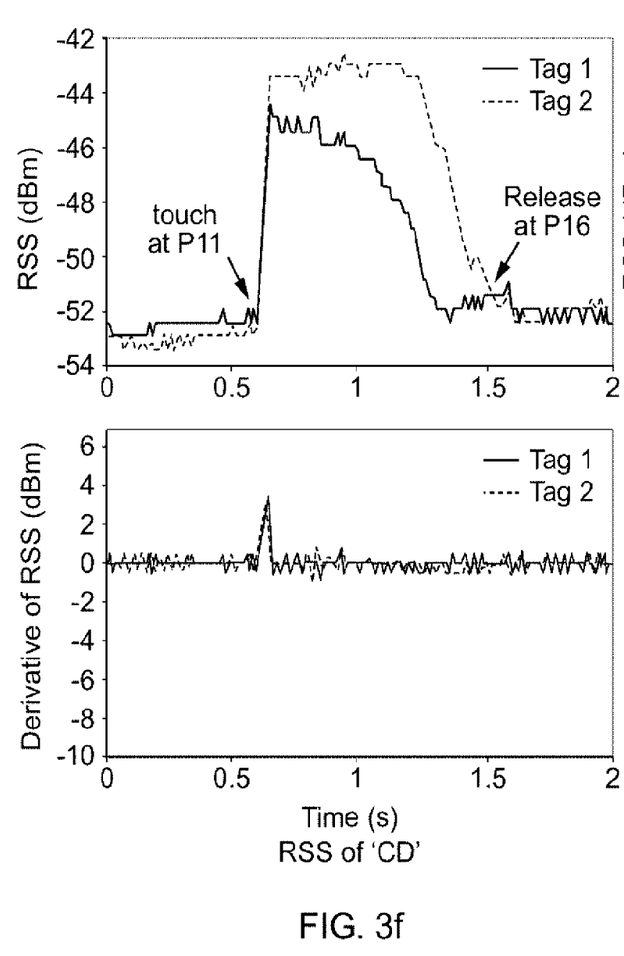
Figure 3G:
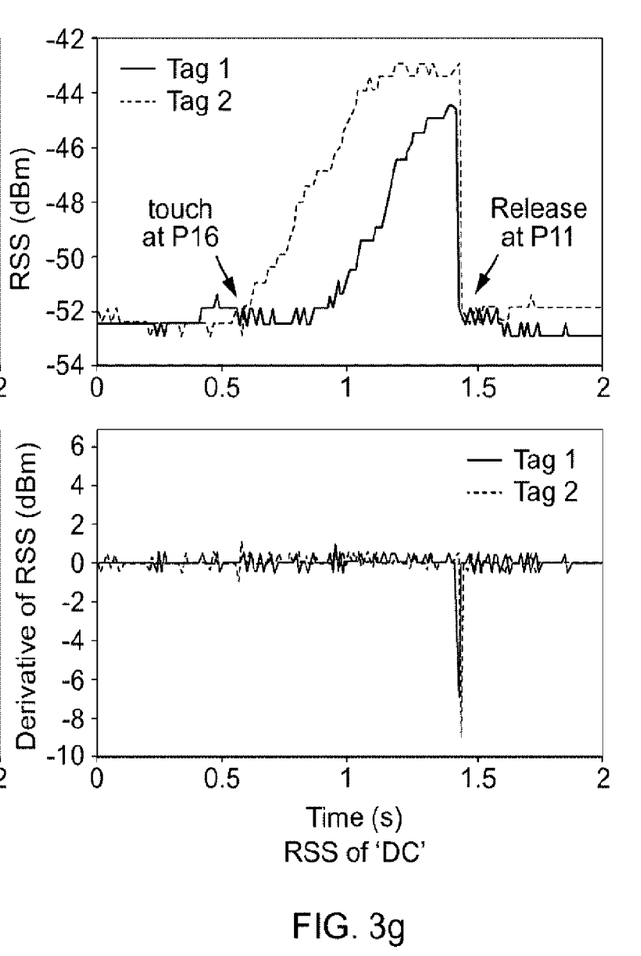
Figure 3H:
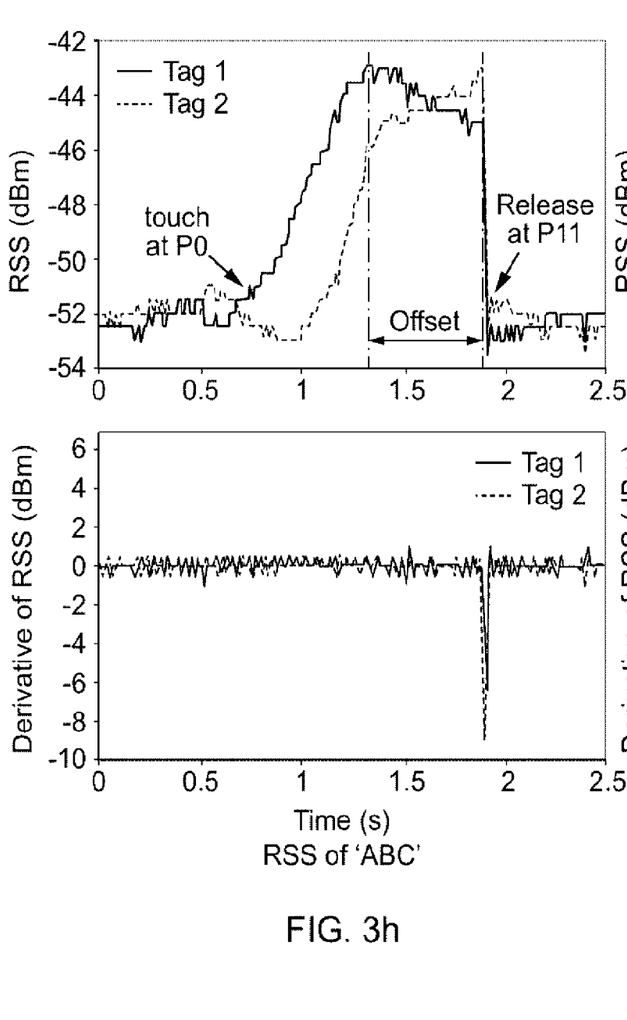
Figure 3I:
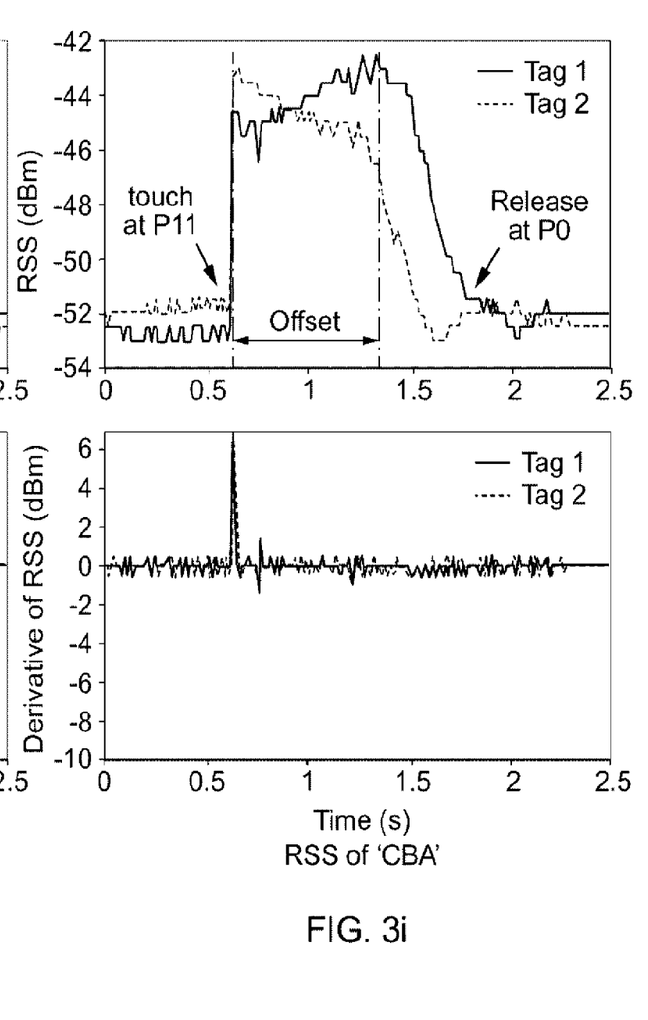
Figure 3J:
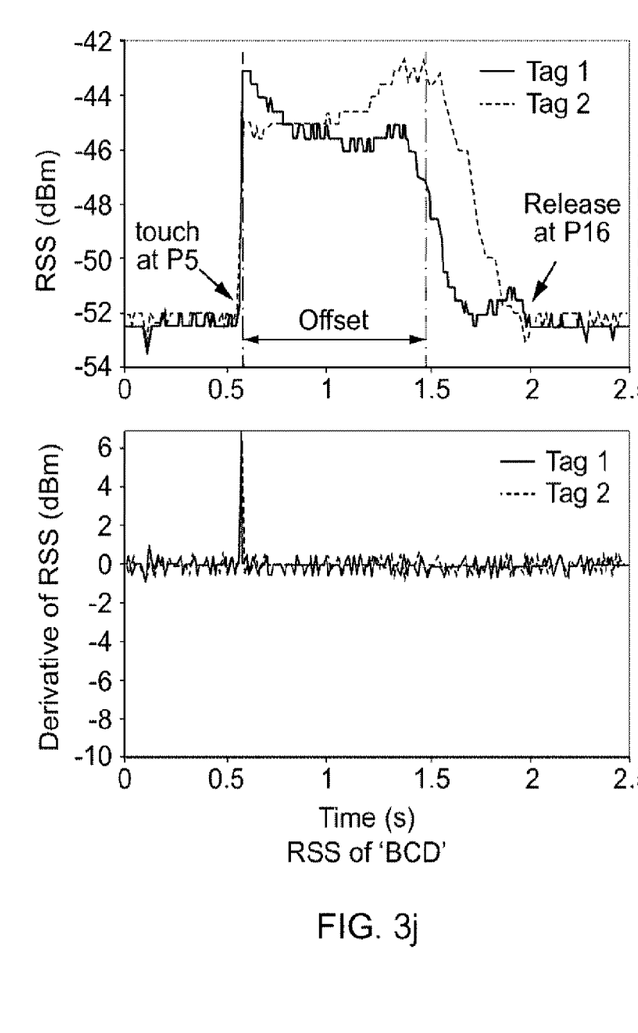
Figure 3K:
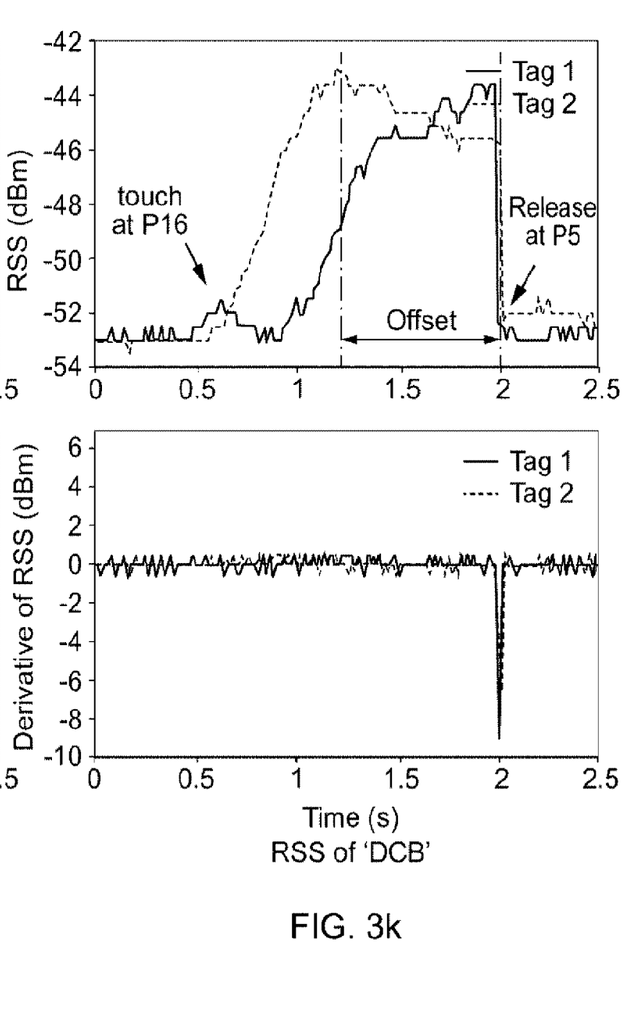

On the basis of the foregoing, three sections can be defined along the transmission lines, 4, 5 segmented by the 5 cm and 11 cm RSS peak (maximum) positions. For notational convenience, the boundary positions of the three sections are labelled A, B, C, and D, as shown in FIGS. 1 and 3. Using these labels and sections, ten different finger sliding gestures can be defined, where each gesture is performed by sliding a finger along a specific section of the transmission lines 4, 5. FIG. 3a illustrates the transmission line sections, boundary labels, and the sliding gestures as directional labelled arrows.

For example, the gesture of a finger sliding from A to B may be defined as input gesture AB. Similarly, the gesture of a finger sliding from A to B and continuing to C, can be defined as input gesture ABC. For convenience, pairs of gestures sharing section boundaries that are differentiated only by sliding direction are identified herein with/, such as AB/BA for the related gestures A to B and B to A.

As discussed briefly above, a detection method may be executed by processor 7 on a according to a detection algorithm designed to reliably differentiate gestures based on RSS signal features related to the gestures.

In an embodiment, signal features may be used to robustly detect ten gesture inputs. The top and bottom plots of FIG. 3 (*b-k*) show the RSS and RSS derivative of tags 1 and 2 for each gesture input, respectively, where RSS is a sequence $R=\{r_1, \ldots, r_i, \ldots r_N\}$ and the RSS derivative is $y_i=r_{i+1}-r_i$, $1<i<N-1$. In each plot, the first 0.5 s shows the baseline RSS values, when there is no touch event. Then, a finger slides on the transmission lines, thereby changing the RSS values. Four signal features (Peaks, Offset, Relative and Trend), which are robust to location changes of the device relative to reader 6, are used by the detection algorithm for recognizing the ten finger gesture inputs, as shown in Table 1.

TABLE 1

Signal features for the sliding finger gestures.

| Gesture | Peaks | | Offset | | Relative | Trend | |
|---------|-------|-------|-------|-------|----------|-------|-------|
|         | $N_1$ | $N_2$ | $O_1$ | $O_2$ | $\Delta R$ | $T_1$ | $T_2$ |
| AB      | 1 | 1 | 0 | 0 | >0  | ↗ | ↗ |
| BA      | 1 | 1 | 0 | 0 | >0  | ↘ | ↘ |
| BC      | 2 | 2 | 0 | 0 | n/a | ↘ | ↗ |
| CB      | 2 | 2 | 0 | 0 | n/a | ↗ | ↘ |
| CD      | 1 | 1 | 0 | 0 | <0  | ↘ | ↘ |
| DC      | 1 | 1 | 0 | 0 | <0  | ↗ | ↗ |
| ABC     | 1 | 1 | 1 | 0 | n/a | ↗↘ | ↗ |
| CBA     | 1 | 1 | 1 | 0 | n/a | ↘↗ | ↘ |
| BCD     | 1 | 1 | 0 | 1 | n/a | ↘ | ↗↘ |
| DCB     | 1 | 1 | 0 | 1 | n/a | ↗ | ↘↗ |

Feature 1: Peaks (N1, N2). As can be seen in FIG. 3, when a finger touches or releases the position B or C, the RSS changes very rapidly. This is because the RSS value when a finger touches the two positions is at its peak. These sudden changes create spikes in the derivatives of the RSS measurements, as shown in FIG. 3. Therefore, processor 7 can count the spikes in the derivatives of RSS to detect if the gesture has started or ended at position B or C. As can be seen in FIG. 3, the derivatives of RSS for gestures AB/BA, CD/DC, ABC/CBA, and BCD/DCB have one spike, while the gestures BC/CB have two spikes. Hence, the first feature used in the exemplary detection algorithm is the number of peaks in the derivatives of RSS measurements. Table 1 summarizes the number of peak in derivatives of RSS values for different gestures, where N1 and N2 are the number of peaks for tag 1 and tag 2.

Feature 2: Offset (O1, O2). As can be seen in FIG. 3, for some gestures, such as AB/BA, BC/CB, and CD/DC, the maximum RSS and the spike of the RSS derivative occur at the same time. On the other hand, for some other gestures, such as ABC/CBA and BCD/DCB, there is an offset between when the maximum RSS is reached and the spike of the RSS derivative is registered. Using the input ABC as an example, the derivative of RSS of tag 1 spikes when a finger releases position C, while the maximum RSS happens when the finger is passing position B. This offset is used as the second detection feature. Rather than measuring the exact offset, the detection algorithm set forth herein maps offset to a binary value: 0 for 'no offset' and 1 for 'offset'. In particular, an offset of less than 20 samples (i.e., 100 ms), is considered to be 'no offset', and otherwise it is considered to be 'offset'. Table 1 summarizes the offsets for different gestures, where O1 and O2 represent the offset of tag 1 and tag 2, respectively.

Feature 3: Relative RSS ($\Delta R$). The third feature is the relative RSS magnitude between the two tags. This feature is used to differentiate between AB/BA and CD/DC. This is because most RSS samples of tag 1 are larger than the RSS samples of tag 2 for gesture AB/BA, and most RSS samples of tag 1 are smaller than the RSS samples of tag 2 for gesture CD/DC, as shown in FIG. 3. To compare the relative RSS relationship of two tags, an averaged RSS change is defined:

$$\Delta R = \frac{1}{N}\sum_{i=1}^{N} r(r1, i - r2, i),$$

where $r_{1,i}$ and $r_{2,i}$ are RSS samples of tag 1 and tag 2, respectively. If $\Delta R>0$, it implies that most RSS samples of tag 1 are larger than the RSS of tag 2; if $\Delta R<0$, it implies that most RSS samples of tag 2 are larger than the RSS of tag 1. Table 1 summarizes values of $\Delta R$ for inputs AB/BA and CD/DC.

Because RFID signals can travel from tags 1 and 2 to the reader 6 by two or more paths created by reflectors in the environment, such as walls and furniture, each tag may experience different multipath effects where RSS values vary for each tag differently when the device moves or environment changes. In order to help in differentiating gestures between AB/BA and CD/DC in multipath environments, the baseline RSS of each tag can be measured when there is no finger touch. The baseline can then be removed from all RSS measurements before computing the relative RSS values. This process helps to remove the impact of multipath effects since multipath only adds a constant offset to RSS values.

Feature 4: Trend (T1, T2). As shown in FIG. 3, during the time that a finger is sliding on the transmission line, RSS of each tag is either increasing or decreasing, depending on the gesture input. For example, for the input AB, RSS values of both tags increase. For the input BC, the RSS of tag 1 decreases while the RSS of tag 2 increases. Therefore, the increase or decrease trend of RSS values can be used as a feature for gesture detection. Table 1 summarizes the RSS trend for all gesture inputs, where T1 and T2 represent the RSS trend ('↗' for increase and '↘' for decrease) of tag 1 and tag 2, respectively.

Figure 4:
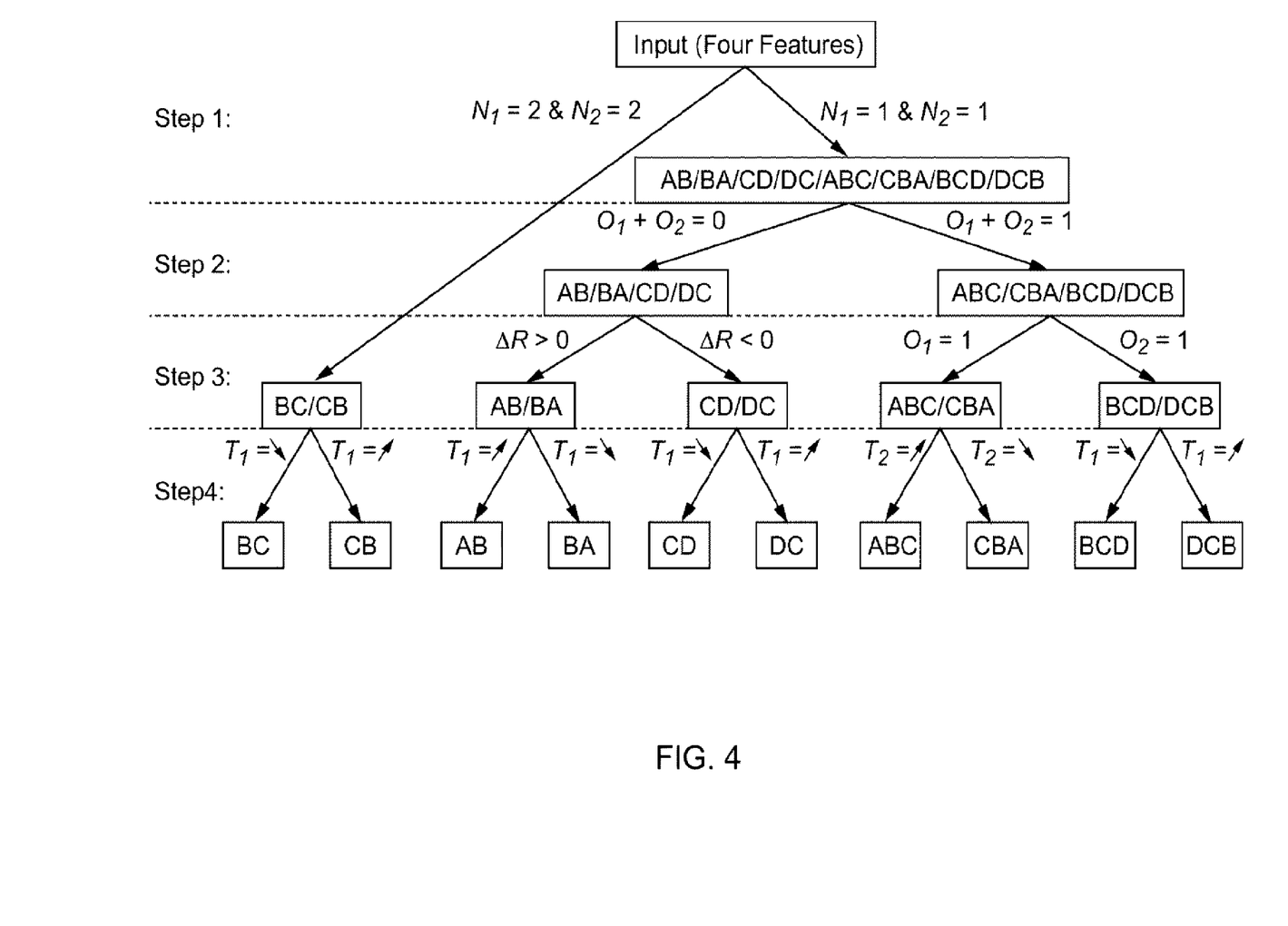
FIG. 4 is a decision tree showing steps in a sliding finger gesture detection algorithm using the sequences of RSS values and numerical derivatives of FIG. 3

FIG. 4 shows a decision tree classifier used by the detection algorithm to detect and classify gestures using the four features discussed above. The decision tree has four steps.

In the first step, the 'Peak' feature (Feature 1) is used to decide whether the performed gesture is BC/CB or other possible gestures. Note that for gesture BC/CB, there are two peaks (i.e., $N_1=2$, $N_2=2$) in the derivatives of RSS, while for other gestures, there is only one peak (i.e., $N_1=1$, $N_2=1$).

Next, the 'Offset' feature (Feature 2) is used to decide whether the gesture is one of AB/BA, CD/DC or one of ABC/CBA, BCD/DCB. As discussed above, when a finger slides through position B or C, there may be a time offset between the maximum RSS and the spike in RSS derivatives. Specifically, if the gesture is one of ABC/CBA, BCD/DCB, one of the offsets will be non-zero (i.e., $O_1+O_2=1$). Otherwise, both offsets will be zero (i.e., $O_1+O_2=0$).

The third step has two sub-steps. First, the feature 'Relative RSS' (Feature 3) is used to distinguish between the gestures AB/BA and CD/DC. As shown in Table 1, this feature is positive (i.e., $\Delta R>0$) when the gesture is AB/BA and it is negative (i.e., $\Delta R<0$) when the gesture is CD/DC. Second, the feature 'Offset' (Feature 2) is used to differentiate between ABC/CBA and BCD/DCB. As shown in Table 1, for gesture ABC/CBA, $O_1=1$ and $O_2=0$, while for gesture BCD/DCB, $O_1=0$ and $O_2=1$.

Finally, the direction of two gestures that share section boundaries are distinguished using the 'Trend' feature (Feature 4). For example, in order to distinguish between AB/BA, the trend for tag 1 is upward (i.e., $T_1=↗$) for the gesture AB, while it is downward for the gesture BA (i.e., $T_2=↘$). As shown in FIG. 4, similar decisions can be made for other pairs of related gestures.

As set forth above, an RFID-based system and method are provided for detecting a diverse range of sliding finger input gestures, while remaining robust to device location changes and typical RF environment changes caused by nearby people. In one aspect, a transmission line is used as a touch sensor between two RFID tags, and the characteristics of RSS values over time are used for heuristics-based recognition. The method and system discussed above can be adopted to create simple, low-cost, and battery-free input solutions for a wide range of smart devices and other real world applications.

Although the exemplary embodiment discussed herein detects ten different input gestures using two RFID chips, the system may be extended to detect more inputs using the method and apparatus discussed herein in different configurations with multiple microchips. For example, three RFID tags can be disposed on vertices of a triangle, and connected using three transmission lines to detect ten input gestures per edge of the triangle, enabling an input device capable of detecting thirty gestures. Another possible configuration is a 2D grid of transmission lines along with an appropriately modified detection algorithm for a greatly expanded gesture set.

The many features and advantages of the invention are apparent from the detailed specification and, thus, it is intended by the appended claims to cover all such features and advantages of the invention that fall within the t scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. Apparatus for finger input sensing, comprising:
    at least two RFID tags, each including a microchip and an antenna;
    a reader for interrogating the at least two RFID tags; and
    at least two transmission lines connecting the at least two RFID tags via their respective antennas, whereby upon interrogation by the reader each RFID tag returns a characteristic received signal strength (RSS) and pattern of RSS changes for different sliding finger gestures between spaced touch positions along the at least two transmission lines.

2. The apparatus of claim 1, wherein spaced touch positions are arranged in sections along the transmission lines delineated by boundary positions for defining different finger sliding gestures, wherein each sliding gesture is performed by sliding a finger along a specific section of the transmission lines such that the RSS of each tag increases to a peak at a specific touch position and decreases for positions on opposite sides of the specific position.

3. The apparatus of claim 1, having seventeen said spaced touch positions arranged in three said sections delineated by four said boundary positions (A, B, C, and D) for defining ten said different finger sliding gestures (A to B, B to C, C to D, B to A, C to B, D to C, A to B to C, C to B to A, B to C to D and D to C to B).

4. The apparatus of claim 3, wherein the length of the transmission lines is 16 cm and each touch position is separated by 1 cm.

5. A method for finger input sensing, comprising:
    interrogating at least two RFID tags by a reader;
    transmitting from each of the at least two RFID tags connected by at least two transmission lines a characteristic received signal strength (RSS) and pattern of RSS changes for different sliding finger gestures between spaced touch positions along the at least two transmission lines;
    receiving the characteristic received signal strength (RSS) and pattern of RSS changes from each of the at least two RFID tags at the reader;
    arranging a plurality of spaced touch positions in sections along the transmission lines delineated by boundary positions for defining different finger sliding gestures, wherein each sliding gesture is performed by sliding a finger along a specific section of the transmission lines such that the RSS of each tag increases to a peak at a specific touch position and decreases for positions on opposite sides of the specific position; and
    detecting each sliding gesture by analyzing a plurality of features relating to the number of spikes in the derivatives of the RSS, timing of maximum RSS and the spikes of the RSS derivatives, relative RSS magnitude between the at least two RFID tags, and increase/decrease trend of the RSS.

6. The method of claim 5, wherein the plurality of spaced touch positions comprises seventeen spaced touch positions arranged in three said sections delineated by four said boundary positions (A, B, C, and D) for defining ten said different finger sliding gestures (A to B, B to C, C to D, B to A, C to B, D to C, A to B to C, C to B to A, B to C to D and D to C to B).

7. The method of claim 6, wherein a first feature comprises counting spikes in the derivatives of RSS to detect if the gesture has started or ended at position B or C, wherein the derivatives of RSS for gestures AB/BA, CD/DC, ABC/CBA, and BCD/DCB have one spike, while the gestures BC/CB have two spikes.

8. The method of claim 6, wherein a second feature comprises measuring offset between maximum RSS and the spike of the RSS derivative, wherein for gestures AB/BA, BC/CB, and CD/DC the maximum RSS and the spike of the RSS derivative occur simultaneously, for gestures ABC/CBA and BCD/DCB, there is an offset between when the maximum RSS is reached and the spike of the RSS derivative.

9. The method of claim 8, wherein measuring offset comprises mapping offset to a binary value wherein 0 represent no offset and 1 represents an offset.

10. The method of claim 9, wherein a measured offset of less than 20 samples maps to binary 0 and a measured offset of equal or greater than 20 samples maps to binary 1.

11. The method of claim 6, wherein a third feature comprises measuring relative RSS magnitude between the at least two RFID tags to differentiate between gestures AB/BA and CD/DC.

12. The method of claim 11, wherein measuring relative RSS magnitude comprises measuring an averaged RSS change $$\Delta R = \frac{1}{N}\sum_{i=1}^{N} r(r1, i - r2, i),$$

where $r_{1,i}$ and $r_{2,i}$ are RSS samples of first and second ones of the at least two RFID tags such that if $\alpha R>0$, most RSS samples of the first RFID tag are larger than the RSS of the second RFID tag 2 and if $\Delta R<0$, most RSS samples of the second tag are larger than the RSS of the first tag.

13. The method of claim 12, further comprising measuring a baseline RSS of each of the plurality of RFID tags when there is no finger touch and removing the baseline from all RSS measurements before measuring relative RSS values for differentiating gestures between AB/BA and CD/DC in multipath environments.

14. The method of claim 6, wherein a fourth feature comprises the increase/decrease trend of the RSS of first and second ones of the at least two RFID tags, such that for the gesture AB, RSS values of the first and second RFID tags increase and for gesture BC RSS of the first RFID tag decreases while RSS of the second RFID tag increases.

15. The apparatus of claim 1, comprising three RFID tags disposed on vertices of a triangle and connected using three transmission lines to detect ten sliding finger gestures per edge of the triangle.

* * * * *